(No Model.) 2 Sheets—Sheet 1.

W. GOWEN.
SAW MILL.

No. 383,461. Patented May 29, 1888.

Witnesses:
Inventor:
William Gowen
By ... Attorney.

(No Model.) 2 Sheets—Sheet 2.
W. GOWEN.
SAW MILL.
No. 383,461. Patented May 29, 1888.
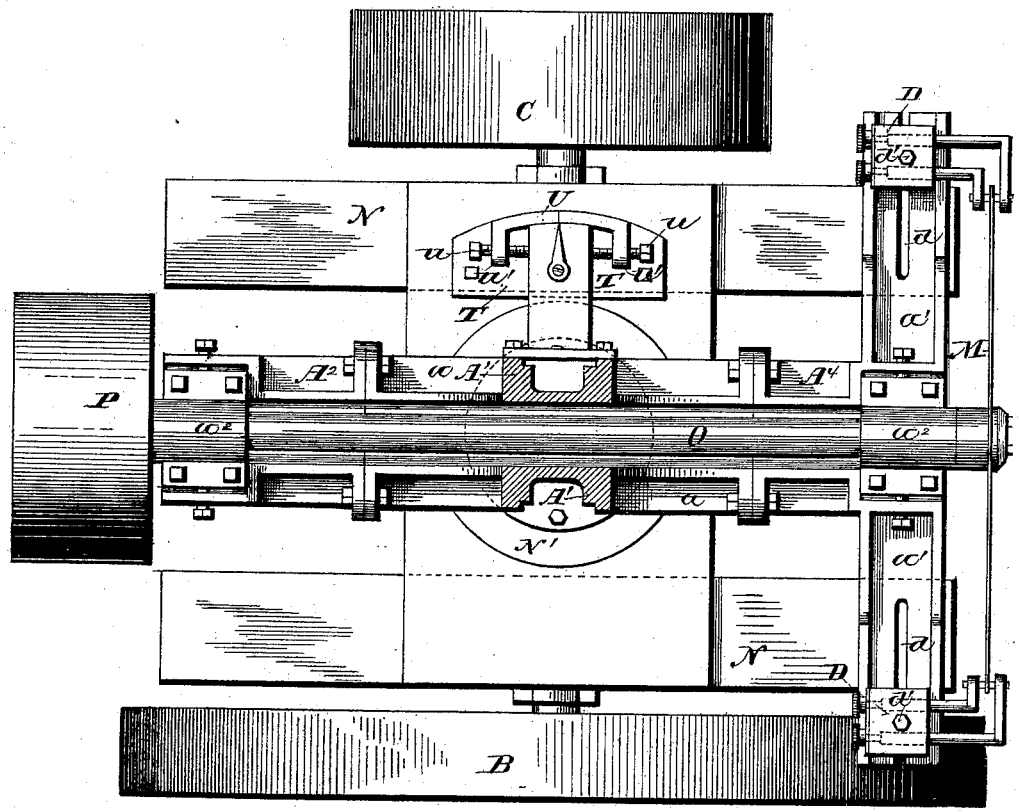
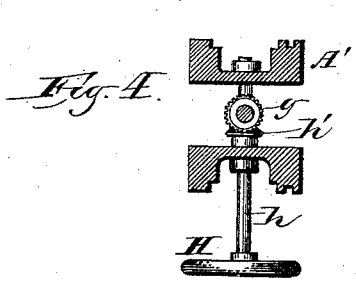
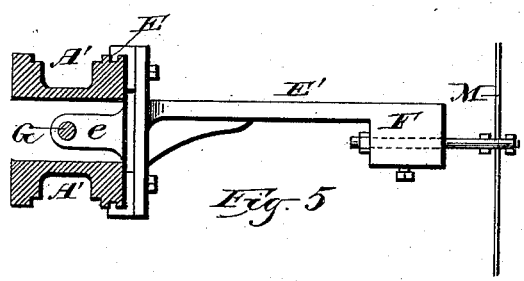

UNITED STATES PATENT OFFICE.

WILLIAM GOWEN, OF WAUSAU, WISCONSIN.

SAW-MILL.

SPECIFICATION forming part of Letters Patent No. 383,461, dated May 29, 1888.

Application filed May 2, 1887. Serial No. 236,797. (No model.)

*To all whom it may concern:*

Be it known that I, WILLIAM GOWEN, of Wausau, in the county of Marathon and State of Wisconsin, have invented certain new and useful Improvements in Saw-Mills; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to so combine a circular with a band-saw mill as to readily change from one to the other, as desired.

It consists, essentially, of an upright supporting post or standard carrying the band wheels and saw, provided with bearings for a circular saw and arranged to be turned or swung about its axis.

In the accompanying drawings like letters designate the same parts in the several figures.

Figure 1:
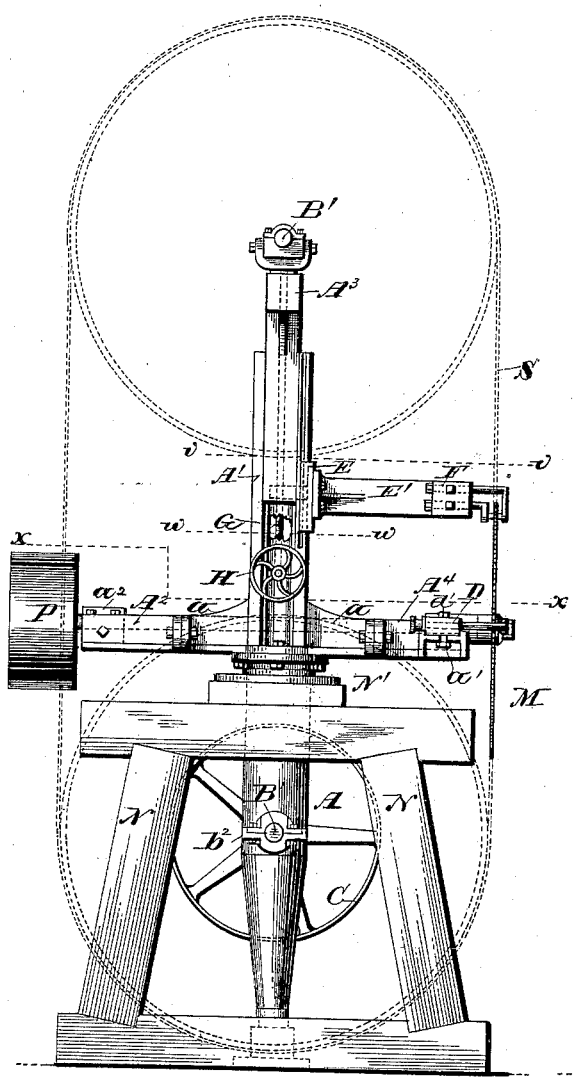
Figure 2:
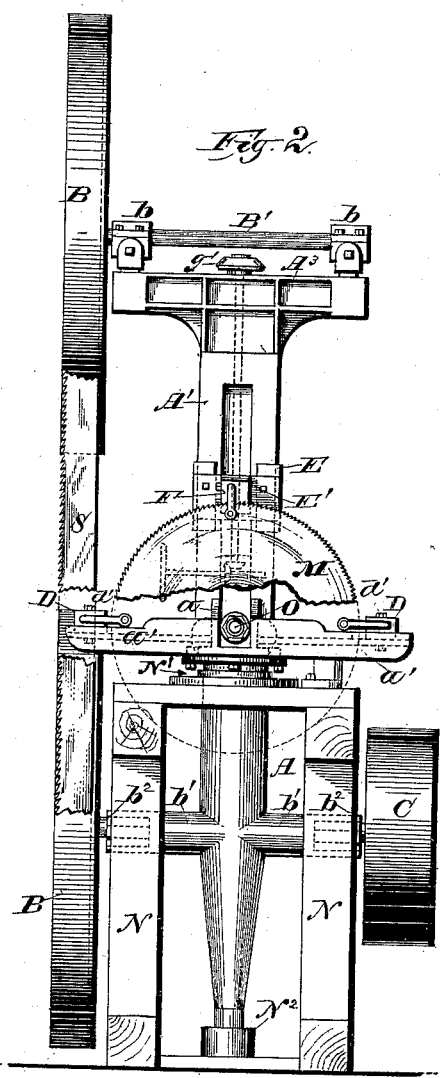

Figure 1 is a front elevation of my combined mill. Fig. 2 is a side elevation of the same. Fig. 3 is a horizontal section on the line $x\,x$, Fig. 1, of the supporting-standard, showing, on an enlarged scale, a plan view of the circular saw and its connections. Fig. 4 is a like section on the line $w\,w$, Fig. 1, showing the mechanism for operating the upper circular-saw guide; and Fig. 5 is a like section on the line $v\,v$, Fig. 1, showing the upper circular-saw guide, its supporting-arm, and connections.

A A' represent a central upright supporting-column cast, for convenience, in two sections. The lower section, A, is formed with a tubular cross-piece, $b'\,b'$, furnished at the ends with boxes $b^2\,b^2$ for the lower band-wheel shaft B', and bears at its lower end in a step, $N^2$, and at or near its upper end in a box, N', secured to suitable frame-work, N N, provided for the purpose. The upper section, A', bolted to said lower section just above the box N', is formed with ways for the vertically-adjustable T-slide $A^3$, provided with adjustable boxes $b\,b$ for the upper band-wheel shaft B'.

B B are the band-wheels, and S the band-saw mounted thereon.

At the lower end of said section A', on each side thereof, are formed horizontal arms $a\,a$, which have terminal ears or flanges for the attachment of extensions $A^2$ and $A^4$, furnished with boxes $a^2\,a^2$, as shown in Fig. 3, for the circular-saw mandrel O, which passes through a transverse vertical slot in said standard A'. The arm $A^4$ is formed at its outer end, on opposite sides, with the longitudinally-slotted cross-arms $a'\,a'$, which support the front and rear circular-saw guides D D, adjustably attached thereto.

F is the upper circular-saw guide, attached to or formed with its supporting-arm E', which is in turn attached to the shoe or slide E, movable vertically on ways formed therefor on standard A'. To this same shoe, E, is secured the upper band-saw guide and its support when the band-saw is to be used.

G is an upright screw placed in the vertical slot in section A' of the supporting-standard and bearing at its upper end in the T-slide $A^3$, and working below with a threaded ear or nut, $e$, on the shoe E.

$h$ is a short horizontal shaft having a bearing in section A' of the supporting-standard, and provided at its outer end with a hand-wheel, H, and with a bevel-gear, $h'$, which works with a similar gear, $g$, on the screw-shaft G, for the purpose of raising and lowering the guide F. The screw G is provided at its upper end with a bevel friction-wheel, $g'$, arranged to work with similar driving friction-wheels (not shown) on the upper band-wheel shaft B', and thus raise and lower the upper band-saw guide when the band-saw S is in operation.

C is the driving-pulley of the band-saw mill, mounted upon the lower band-wheel shaft B', and P is the circular-saw-driving pulley, mounted upon the end of the mandrel O opposite the saw M.

T is an arm attached to and extending laterally from the central supporting-standard and working with an arc-shaped guide, U.

$u\,u$ are adjusting-bolts which work with transverse ears or nuts $u'\,u'$, formed at the ends of the arc guide U, and bear at their tips on opposite sides of the arm T, for the purpose of moving the central supporting-standard about its vertical axis and of holding the same in place when adjusted as desired.

Where band-saws are employed it is frequently desirable to change from the band to a circular saw for certain kinds of work and lumber—as, for example, when small rough logs are to be sawed a circular saw can be used to better advantage. To facilitate the changing from one saw to the other is the main object of my invention, although it possesses advantages when applied to circular saws alone. By casting the short arms *a a* on section A' of the supporting-standard the circular-saw bearings can at any time be readily attached to the machine, if desired. To change from the band to the circular saw, the saw S is removed from the band-wheels B B, the upper band-saw guide and its supporting-arm replaced by the guide F and its supporting-arm E', the belt thrown off from the driving-pulley C, and power applied to the circular-saw-driving pulley P, the circular saw M having been first properly secured upon the mandrel O.

The upper circular-saw guide, F, is adjusted vertically by means of a hand-wheel, H, as previously described, and the front and rear guides D D may be moved toward or from the center of the saw by loosening the bolts *d' d'*, which pass through the slots *d d* and engage the supporting-arms *a' a'*. When it is desired to resume work with the band-saw, it is replaced upon the band-wheels B B, the circular saw M removed from its mandrel, and the guide F replaced by the band-saw guide, which is raised and lowered by the same screw, G, employed to operate the circular-saw guide; but when the said screw G is used in connection with the band-saw guide it may be driven from the upper band-wheel shaft, as previously described.

I claim—

1. The combination of an upright supporting post or standard movable about its axis, band-wheels supported and movable with said central standard, a band-saw mounted upon said band-wheels, and a circular saw supported by and movable with said standard, substantially as and for the purposes set forth.

2. In a saw-mill, the combination of an upright standard or column supported by and capable of angular movement in suitable bearings and provided on opposite sides with laterally-projecting bracket-bearings, the saw and its mandrel supported transversely to said column in said bracket-bearings, a saw-guide attached to an arm projecting laterally from said standard or column and partaking of its angular movement, and mechanism for imparting an angular movement to said standard or column, substantially as and for the purposes set forth.

3. The combination, with an upright post or standard movable about its axis, provided with lateral arms and bearings for a circular-saw mandrel, of a circular saw supported in said bearings and movable with said standard, and a vertically-adjustable guide-support working in ways on said standard, substantially as and for the purposes set forth.

4. The combination, with an upright post or standard movable about its axis, furnished with bearings for a horizontal saw-mandrel and with vertical ways for a guide-support, of a circular saw mounted upon said mandrel, a guide-supporting arm movable vertically upon said ways, and an adjusting-screw working with said guide-supporting arm, substantially as and for the purposes set forth.

5. The combination, with an upright post or standard arranged to be turned about its axis, of arms extending laterally from said standard and provided with boxes for the saw-mandrel, cross-arms projecting transversely to the saw-mandrel from its adjacent supporting-arm, and guides adjustably attached to said cross-arms and working with the saw in front and rear of the mandrel, substantially as and for the purposes set forth.

6. In a saw-mill, the combination, with the band-wheels and their shafts, of an upright supporting post or standard capable of angular movement about its axis and provided with bearings for a circular-saw mandrel and with bearings for said band-wheel shafts, substantially as and for the purposes set forth.

In testimony that I claim the foregoing as my own I affix my signature in presence of two witnesses.

WILLIAM GOWEN.

Witnesses:
CHAS. L. GOSS,
GEORGE M. GOLL.